United States Patent

Liu et al.

[11] Patent Number: 5,953,070
[45] Date of Patent: Sep. 14, 1999

[54] DIGITAL PULSE FILTERING CIRCUIT

[75] Inventors: Don Liu, Yung-Kang; Neil Tai, Hsinchu, both of Taiwan

[73] Assignee: United Microelectronics Corp., Taiwan

[21] Appl. No.: 08/876,247

[22] Filed: Jun. 16, 1997

[30] Foreign Application Priority Data

Apr. 29, 1997 [TW] Taiwan ................................. 86206769

[51] Int. Cl.$^6$ ................................ H04N 5/08; H04N 5/10
[52] U.S. Cl. ......................... 348/525; 348/526; 348/529; 348/531; 348/513
[58] Field of Search ..................................... 348/525, 526, 348/527, 528, 529, 530, 531, 532, 534, 533, 513, 512; 358/153, 154; H04N 5/08, 5/10

[56] References Cited

U.S. PATENT DOCUMENTS

| | | | |
|---|---|---|---|
| 5,296,928 | 3/1994 | Yamashita | 348/529 |
| 5,349,387 | 9/1994 | Fan Chiang | 348/525 |
| 5,754,250 | 5/1998 | Cooper | 348/521 |
| 5,790,200 | 8/1998 | Tsujimoto | 348/533 |

*Primary Examiner*—John K. Peng
*Assistant Examiner*—Wesner Sajous
*Attorney, Agent, or Firm*—Finnegan, Henderson, Farabow, Garrett & Dunner, L.L.P.

[57] ABSTRACT

A digital pulse filtering circuit for processing composite sync signals is provided. The digital pulse filtering circuit can determine the polarity of an input composite sync signal composed of a horizontal sync signal and a vertical sync signal. The horizontal sync signal is a first periodic pulse train having a first pulse width, while the vertical sync signal is a second periodic pulse train having a second pulse width. The digital pulse filtering circuit includes a horizontal sync filter for filtering out all pulses in the input composite sync signal that have a pulse width less than the pulse width of the horizontal sync signal; and a vertical sync filter, coupled to receive the output of said horizontal sync filter, for filtering out all pulses in the output of said horizontal sync filter that have a pulse width less than the pulse width of the vertical sync signal. The output of said indicating the polarity of the input composite sync signal. A polarity output circuit is used to output the input composite sync signal in a polarity in accordance with the composite-sync polarity signal.

9 Claims, 4 Drawing Sheets

DIGITAL PULSE FILTERING CIRCUIT

BACKGROUND OF THE INVENTION

1. Field of the Invention:

This invention relates to filter circuits, and more particularly, to a digital pulse filtering circuit for processing an input composite sync signal to determine the polarity thereof and thereby output the input composite sync signal in the determined polarity.

2. Description of Related Art:

In conventional monitors, a composite sync signal comprises all the sync signals necessary for proper operation of the monitors. FIG. 1 shows an example of the sync signals used in a monitor, which includes a vertical sync signal Ver(P) and a horizontal sync signal Hor(P). The composite sync signal can be either positive or negative in polarity. In practice, the horizontal sync signal Hor(P) is a first pulse train having a period of from 8.33 $\mu$s (microsecond) to 33.33 $\mu$s and a pulse width of from 1.0 $\mu$s to 3.92 $\mu$s; while the vertical sync signal Ver(P) is a second pulse train having a period of from 8.33 ms (millisecond) to 25 ms and a pulse width of from 0.0384 ms to 0.125 ms.

Given a composite sync signal, the vertical sync component can be obtained by filtering out all the pulses in the composite sync signal that have a pulse width less than that of the horizontal sync signal. Further, the polarity of the composite sync signal can be determined by filtering out all the pulses in the foregoing obtained vertical sync signal that have a pulse width less than that of the vertical sync signal itself, the output of this filtering process is a DC signal with a positive or negative level that indicates the polarity of the composite sync signal.

Conventionally, the two above-mentioned filtering processes are achieved by passing the composite sync signal through analog filters that are constructed with resistors and capacitors. One drawback to these analog filters is that their constituent resistors and capacitors take quite a large space on the circuit boards. Moreover, when the pulses that are to be filtered out is very large in pulse width, the analog filters require the use of large-resistance resistors and large-capacitance capacitors to implement, which take even larger space on the circuit boards and also cause the manufacturing cost to increase. Further, the cutoff frequency of these analog filters is not easy to adjust.

SUMMARY OF THE INVENTION

It is therefore a primary objective of the present invention to provide a digital pulse filtering circuit which is capable of determining the polarity of an input composite sync signal.

It is another objective of the present invention to provide a digital pulse filtering circuit which is still operable when the pulse width of the horizontal/vertical sync signals in the input composite sync signal is changed.

It is still another objective of the present invention to provide a digital pulse filtering circuit whose cutoff frequency is easy to adjust.

In accordance with the foregoing and other objectives of the present invention, a digital pulse filtering circuit for processing composite sync signals is provided. The digital pulse filtering circuit can determine the polarity of an input composite sync signal composed of a horizontal sync signal and a vertical sync signal. The horizontal sync signal is a first periodic pulse train having a first pulse width, while the vertical sync signal is a second periodic pulse train having a second pulse width. Broadly speaking, the digital pulse filtering circuit includes the following constituent elements:

(a) a horizontal sync filter for filtering out all pulses in the input composite sync signal having a pulse width less than the pulse width of the horizontal sync signal;

(b) a vertical sync filter, coupled to receive the output of said horizontal sync filter, for filtering out all pulses in the output of said horizontal sync filter having a pulse width less than the pulse width of the vertical sync signal, the output of said vertical sync filter indicates the polarity of the input composite sync signal; and (c) a polarity output circuit, coupled to receive both of the input composite sync signal and the output of said vertical sync filter, for outputting the input composite sync signal in a polarity based on the output of said vertical sync filter.

The foregoing digital pulse filtering circuit can determine the polarity of the input composite sync signal to thereby output the input composite sync signal in the determined polarity. One advantage of the invention is that, when the pulse width of the horizontal/vertical sync signals in the input composite sync signal is changed, the digital pulse filtering circuit is still operable by simply adjusting the pulse width of the clock signals respectively to the horizontal sync filter and vertical sync filter.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENT

Figure 1:
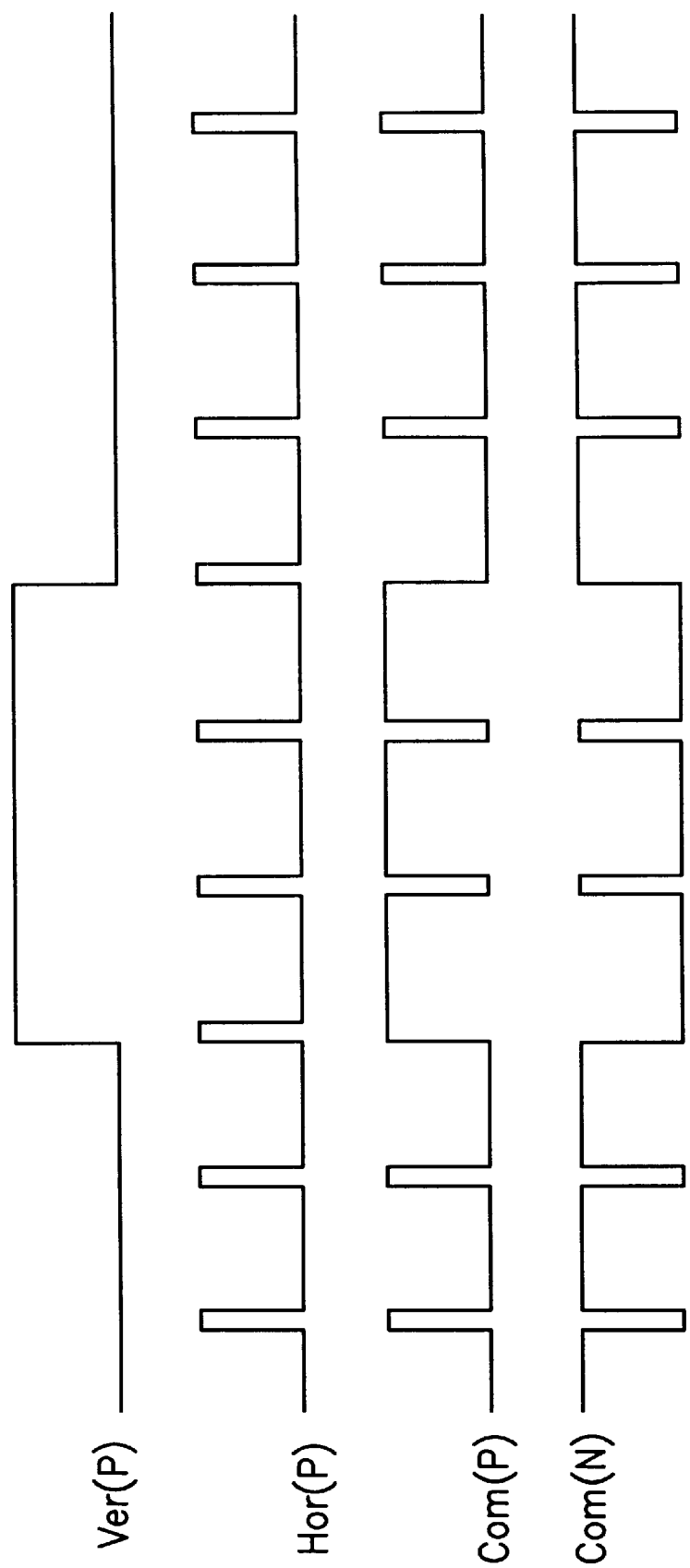
FIG. 1 is a waveform diagram of an example of a vertical sync signal Ver(P), a horizontal sync signal Hor(P), a positive-polarity composite sync signal Com(P), and a negative-polarity composite sync signal Com(N)
Figure 2:
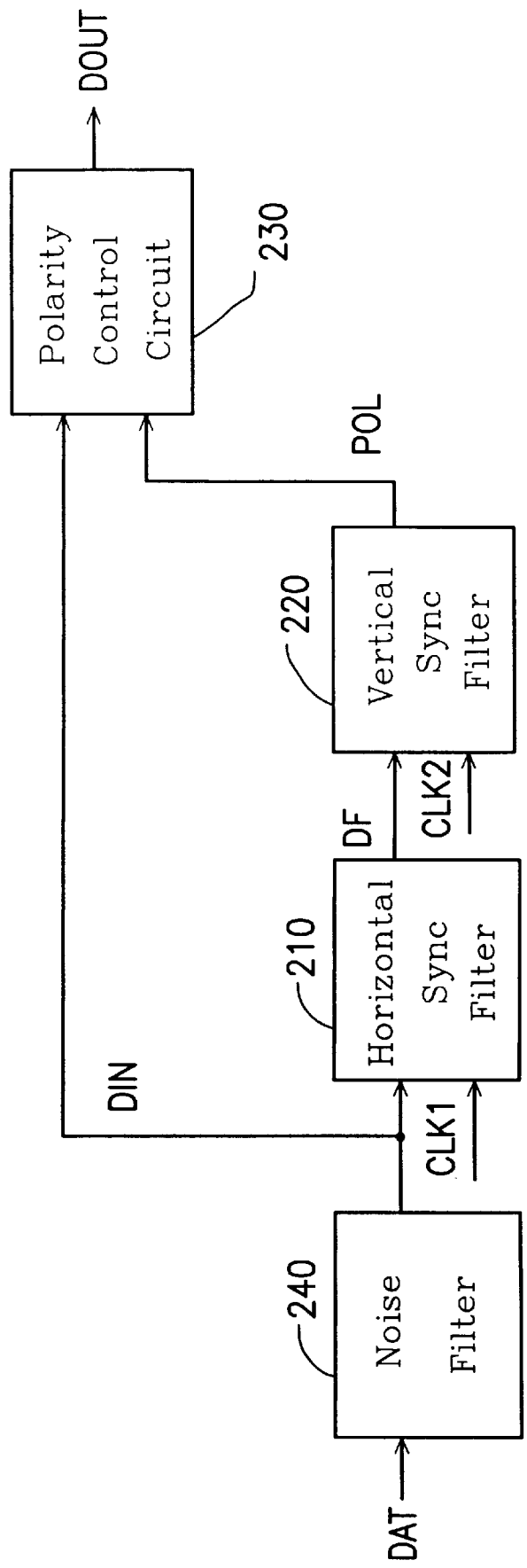
FIG. 2 is a schematic block diagram of the digital pulse filtering circuit of the invention.

FIG. 2 is a schematic block diagram of the digital pulse filtering circuit of the invention used for synchronization control. As shown, the digital pulse filtering circuit of the invention includes a horizontal sync filter 210, a vertical sync filter 220, a polarity control circuit 230, and a noise filter 240.

The noise filter 240 receives an input composite sync signal DAT and filters out the noises in the input composite sync signal DAT. The output of the noise filter 240, which is a noise-free version of the input composite sync signal DAT and designated by DIN, is transferred to both of the horizontal sync filter 210 and the polarity control circuit 230.

The horizontal sync filter 210 is designed in such a manner that it can filter out all the pulses in the input composite sync signal DIN that have a pulse width less than the pulse width of the horizontal sync signal under control of a first periodic clock signal CLK1. The output of the horizontal sync filter 210, designated by DF, is thus equivalent to the vertical sync signal in the received input composite sync signal DAT.

Subsequently, the vertical sync signal DF is transferred to the vertical sync filter 220 where, under control of a second periodic clock signal CLK2, all the pulses in the vertical sync signal DF that have a pulse width less than the pulse width of the vertical sync signal itself are filtered out. The output of the vertical sync filter 220, which is referred to as a composite-sync polarity signal designated by POL, is a DC signal with a negative or positive level that represents the polarity of the input composite sync signal DIN.

The composite-sync polarity signal POL, together with the input composite sync signal DIN, are received by the polarity control circuit 230. The polarity control circuit 230 can perform either an exclusive-NOR operation or an exclusive-OR operation on the composite-sync polarity signal POL and the input composite sync signal DIN. The output of the polarity control circuit 230 is a polarity-corrected version of the input composite sync signal DIN (referred hereinafter as polarity-corrected composite sync signal DOUT). If the polarity control circuit 230 performs an exclusive-NOR operation, the polarity-corrected composite sync signal DOUT will be positive in polarity; and if the polarity control circuit 230 performs an exclusive-OR operation, DOUT will be negative in polarity.

Figure 3:
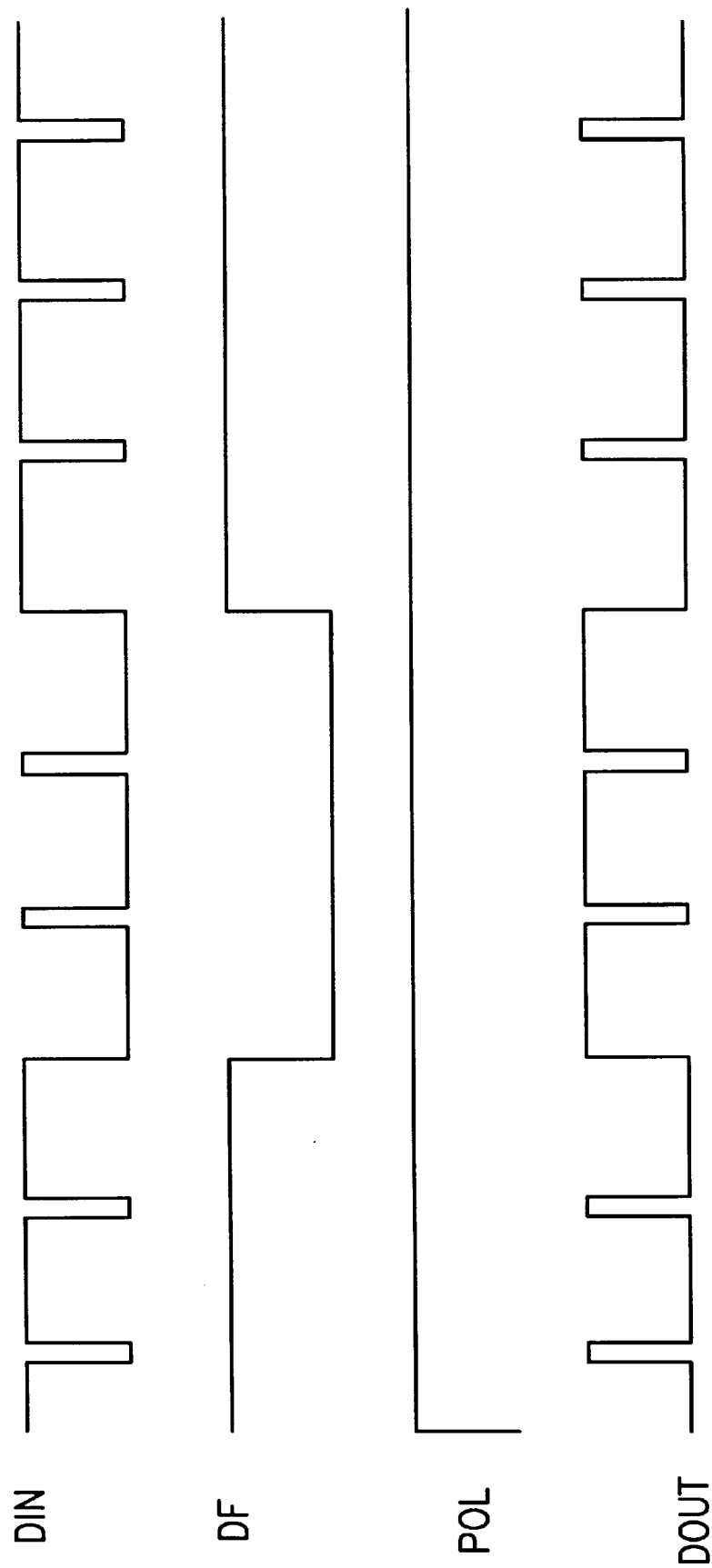
FIG. 3 is a waveform diagram of various signals in the digital pulse filtering circuit of the invention.

FIG. 3 is a waveform diagram used to depict an example of the resulted vertical sync signal DF, the composite-sync polarity signal POL, and the polarity-corrected composite sync signal DOUT in response to the input composite sync signal DIN. Referring also to FIG. 2, after the input composite sync signal DIN passes through the horizontal sync filter 210, its horizontal sync component is filtered out to obtain the vertical sync signal DF, i.e., the high-frequency pulses in the composite sync signal DIN are filtered out. Subsequently, after the vertical sync signal DF passes through the vertical sync filter 220, its vertical sync component is filtered out to obtain the composite-sync polarity signal POL, which is a DC signal with a positive or negative level that indicates the polarity of the input composite sync signal DIN. In the case of FIG. 3, for example, the composite-sync polarity signal POL is a positive DC signal. The polarity control circuit 230 maybe perform an exclusive-OR operation on the composite-sync polarity signal POL and the composite sync signal DIN to thereby obtain the a negative version of the input composite sync signal DIN as the polarity-corrected composite sync signal DOUT. In the case of FIG. 3, for example, the polarity-corrected composite sync signal DOUT is an inverted version of the input composite sync signal DIN.

Figure 4:
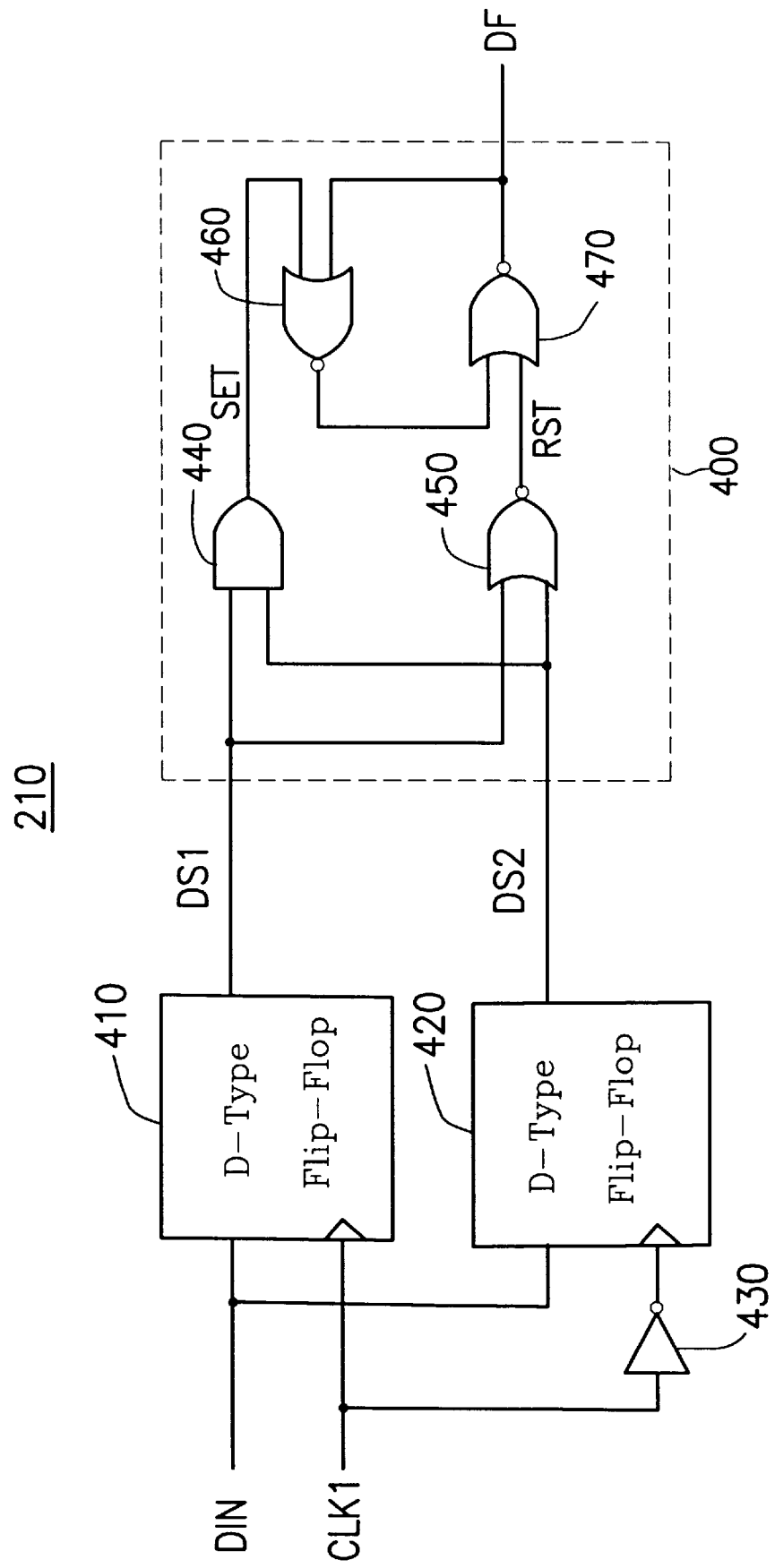
FIG. 4 is a detailed circuit diagram of a horizontal sync filter used in the digital pulse filtering circuit of the invention.

FIG. 4 is a detailed circuit diagram of the horizontal sync filter 210 used in the digital pulse filtering circuit of FIG. 2. As shown, the horizontal sync filter 210 includes a pair of D-type flip-flops 410, 420, an inverter 430, and a logic circuit 400.

The two D-type flip-flops 410,420 are clocked by the clock signal CLK1 in such a manner that the first D-type flip-flop 410 is directly clocked by CLK1, while the second D-type flip-flop 420 is clocked by an inverted version of the clock signal CLK1 that is inverted by the inverter 430. The input composite sync signal DIN is connected to the input of both of the two D-type flip-flops 410, 420. At the appearance of each rising edge in the clock signal CLK1, the first D-type flip-flop 410 outputs a first sampled signal DS1 of the input composite sync signal DIN, which takes on the current voltage state of the composite sync signal DIN; and while at the appearance of each rising edge in the inverted version of the clock signal CLK1 at the output of the inverter 430, the second D-type flip-flop 420 outputs a second sampled signal DS2 of the composite sync signal DIN, which takes on the current voltage state of the composite sync signal DIN. Equivalently, the second sampled signal DS2 is a sampled signal of the composite sync signal DTN at each falling edge in the clock signal CLK1.

The two sampled signals DS1, DS2 of the input composite sync signal DIN are transferred to the logic circuit 400. The logic circuit 400 includes a NAND gate 440, a first NOR gate 450, a second NOR gate 460, and a third NOR gate 470. The logic circuit 400 vertical sync signal DF in response to DS1, DS2 in accordance with the table given in Table 1:

TABLE 1

| DS1 | DS2 | DF |
|---|---|---|
| 1 | 1 | 1 |
| 1 | 0 | unchanged |
| 0 | 1 | unchanged |
| 0 | 0 | 0 |

The NAND gate 440 receives DS1 and DS2 as inputs to thereby output a binary signal SET representing the NAND operation on the current logic states of the two sampled signals DS1, DS2 while the first NOR gate 450 outputs a binary signal RST (reset) representing the NOR operation on the same. The second NOR gate 460 takes the SET signal and the vertical sync signal DF as input and performs a NOR operation on these two inputs. The output of the second NOR gate 460 and the RST signal from the first NOR gate 450 are taken as inputs by the third NOR gate 470 to thereby generate the vertical sync signal DF. This logic structure allows the logic circuit 400 to perform the truth table shown in the going Table 1.

It can be learned from Table 1 that the output vertical sync signal DF will be changed in its logic voltage state only when the first sampled signal DS1 from the first D-type flip-flop 410 is equal in logic voltage state to the second sampled signal DS2 from the second D-type flip-flop 420. Otherwise, the logic voltage state of the vertical sync signal DF will remain unchanged. The allows the horizontal sync filter 210 to filter out all pulses in the composite sync signal DIN that have a pulse width less than half of the period of the clock signal CLK1.

The vertical sync filter 220 is identical in circuit structure as the horizontal sync filter 210 except that the input thereto is the vertical sync signal DF, and that the clock signal CLK2 has a period twice of the pulse width that is to be filtered out. The output of the vertical sync filter 220 is the composite-sync polarity signal POL, which is a DC signal with a negative level or positive level indicating the polarity of the input composite sync signal DIN.

In a practical implementation, for example, the period of the clock signal CLK1 is set to 8 $\mu$s and that of the clock signal CLK2 is set to 1 ms. If the pulse width of the horizontal/vertical sync signal in the composite sync signal is changed, the digital pulse filtering circuit is still operable by correspondingly adjusting the period of the clock signals CLK1, CLK2.

In conclusion, the digital pulse filtering circuit of the invention can determine the polarity of the input composite sync signal and outputs the composite sync signal in its polarity. An aspect of the invention is that, when the pulse width of the horizontal or vertical sync signal in the composite sync signal is changed, the digital pulse filtering circuit is still operable by simply adjusting the pulse width of the clock signals CLK1, CLK2 correspondingly.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A digital pulse filtering circuit for determining the polarity of a composite sync signal composed of a horizontal sync signal and a vertical sync signal, the horizontal sync signal being a first periodic pulse train having a first pulse width and the vertical sync signal being a second period pulse train having a second pulse width, said digital pulse filtering circuit comprising:

a horizontal sync filter for filtering out all pulses in the composite sync signal having a pulse width less than the pulse width of the horizontal sync signal;

a vertical sync filter, coupled to receive the output of said horizontal sync filter, for filtering out all pulses in the output of said horizontal sync filter having a pulse width less than the pulse width of the vertical sync signal, the output of said vertical sync filter indicating the polarity of the input composite sync signal; and a polarity output circuit, coupled to receive the composite sync signal and the output of said vertical sync filter, for outputting the composite sync signal in a polarity based on the output of said vertical sync filter.

2. The digital pulse filtering circuit of claim 1, wherein said horizontal sync filter includes:

a first D-type flip-flop, coupled to receive the composite sync signal as input and under control of a first clock signal, for generating a first sampled signal;

a second D-type flip-flop, coupled to receive the composite sync signal as input and under control of an inverted version of said first clock signal, for generating a second sampled signal; and logic means, receiving the first and second sampled signals as inputs, for generating a logic output in such a manner that the binary output of said logic means remains unchanged when the first and second sampled signals are in different logic levels, and being equal to the logic level of the first and second sampled signals when the first and second sampled signals are equal in logic level.

3. The digital pulse filtering circuit of claim 2, wherein said vertical sync filter includes:

a first D-type flip-flop, coupled to receive the output of said horizontal sync filter as input and under control of a second clock signal, for generating a first sampled signal;

a second D-type flip-flop, coupled to receive the output of said horizontal sync filter as input and under control of an inverted version of said second clock signal, for generating a second sampled signal; and logic means, receiving the first and second sampled signals as inputs, for generating a binary output in such a manner that the binary output of said logic means remains unchanged when the first and second sampled signals are in different logic levels, and being equal to the logic level of the first and second sampled signals when the first and second sampled signals are equal in logic level.

4. The digital pulse filtering circuit of claim 2, wherein said logic means includes:

an AND gate, receiving the first and second sampled signals as inputs, for generating a set signal;

a first NOR gate, receiving the first and second sampled signals as inputs, for generating a reset signal;

a second NOR gate for performing a NOR operation on the set signal and the output of said logic means; and a third NOR gate, receiving the output of said second NOR gate and the reset signal as inputs, for generating a binary output serving as the output of said logic means which serves as the output of said horizontal sync filter.

5. The digital pulse filtering circuit of claim 2, wherein the first clock signal is a periodic pulse train having a period twice of the pulse width of the horizontal sync signal.

6. The digital pulse filtering circuit of claim 3, wherein the second clock signal is a periodic pulse train having a period twice of the pulse width of the vertical sync signal.

7. The digital pulse filtering circuit of claim 1, wherein said polarity control circuit performs an Exclusive-OR operation on the input composite sync signal and the composite-sync polarity signal to obtain the output of said digital pulse filtering circuit.

8. The digital pulse filtering circuit of claim 1, wherein said polarity control circuit performs an Exclusive-NOR operation on the input composite sync signal and the composite-sync polarity signal to obtain the output of said digital pulse filtering circuit.

9. The digital pulse filtering circuit of claim 1, further comprising:

a noise filter for filtering out noises in the input composite sync signal.

* * * * *